United States Patent [19]

Swartzendruber

[11] Patent Number: 4,495,894
[45] Date of Patent: Jan. 29, 1985

[54] FEED DISTRIBUTION APPARATUS

[75] Inventor: Ray E. Swartzendruber, Syracuse, Ind.

[73] Assignee: Chore-Time Equipment, Inc., Milford, Ind.

[21] Appl. No.: 536,768

[22] Filed: Sep. 28, 1983

[51] Int. Cl.³ .......................................... A01K 39/012
[52] U.S. Cl. ............................. 119/51 R; 119/52 AF
[58] Field of Search .................. 119/52 AF, 51 R, 53

[56] References Cited

U.S. PATENT DOCUMENTS

| | | | |
|---|---|---|---|
| 2,681,639 | 6/1954 | Littlefield | 119/52 AF |
| 3,003,464 | 10/1961 | Bailey | 119/52 AF |
| 3,893,423 | 7/1975 | Hostetler | 119/52 AF |
| 3,918,405 | 11/1975 | Hostetler | 119/52 AF |
| 4,060,055 | 11/1977 | Skinner | 119/52 AF |
| 4,301,768 | 11/1981 | Osborn | 119/52 AF |

FOREIGN PATENT DOCUMENTS 802597  9/1936  France .

Primary Examiner—Hugh R. Chamblee
Attorney, Agent, or Firm—Trexler, Bushnell & Wolters, Ltd.

[57] ABSTRACT

Disclosed is a conveyor system for delivering feed to poultry cages which are organized in an oppositely facing, multi-level array. The system comprises a first endless conduit extending along an upper conduit run past an upper level of cages facing in a first direction, and extending along a lower conduit run past a lower level of cages facing in a second or opposite direction. A second endless conduit extends along an upper conduit run past an upper level of cages facing in that opposite direction, and extends along a lower conduit run past the lower level of cages facing in the first direction. Displaceable driver elements disposed in these endless conduits carry feed in trough runs past the adjacent cages. An overhead delivery conveyor delivers feed to these first and second conduits. First and second drop tubes permit the level of feed in the conduits to be adjusted. This adjustment discourages the poultry from playing with or raking the feed.

20 Claims, 8 Drawing Figures

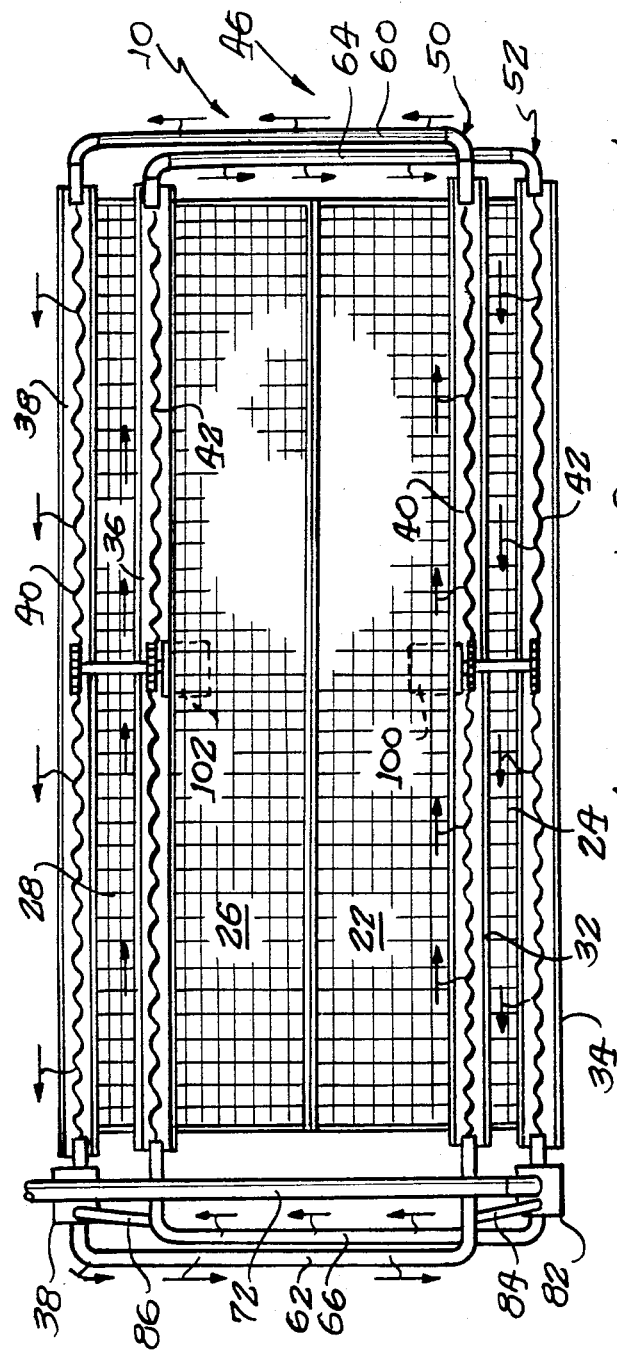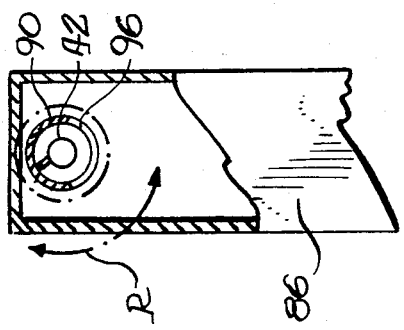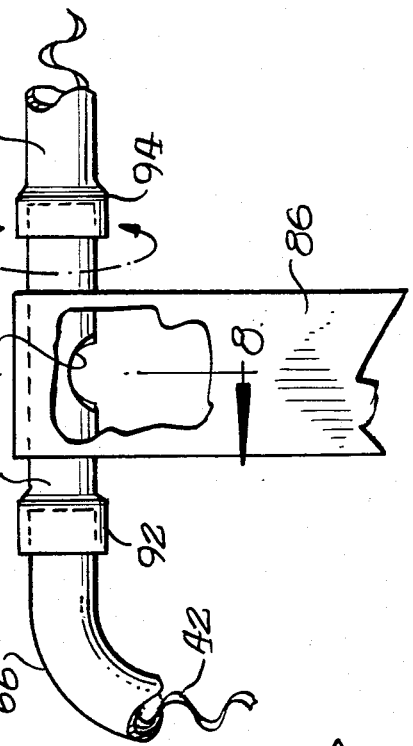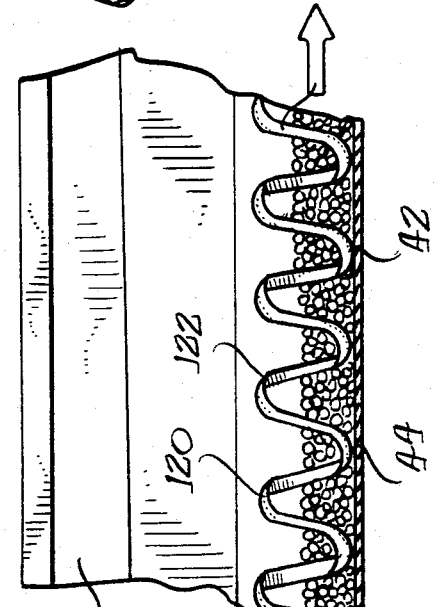

FEED DISTRIBUTION APPARATUS

BACKGROUND OF THE INVENTION

This invention relates generally to feeding systems for caged animals such as poultry. More particularly, it concerns a feeding system in which feed is intermixed during delivery and during conveyance for consumption, so as to encourage the delivery of substantially equal amounts and kinds of feeds to each row of confinement cages.

Modern poultry operations use sophisticated equipment for maintaining large flocks of birds inside poultry houses of extended size. In layer or egg producing operations, it is helpful to maintain the birds inside cages so that food and water can be delivered to the poultry economically and in accurately rationed amounts. In addition, eggs can be economically collected from the caged laying flocks by specialized egg-handling devices. These cages can be constructed and erected so as to take the form of a stepped-back pyramidal array, as explained in U.S. Pat. No. 4,060,055.

Other cage array designs can be used. When the birds are properly cared for, high flock performance levels can be reached: that is, maximized numbers of eggs can be obtained from the laying hens from minimized amounts of food and water.

The mechanized delivery of feed is usually accomplished by a feed conveyor system having a series of conduits within which are located feed driver elements. These conduits can take the form of closed tube sections of extended length, or they can take the form of troughs located adjacent the poultry cages. In these troughs, feed driver elements are carried within open tube-like structures in the troughs, usually at the trough side or bottom. When feed is delivered to the tubes and the driver elements are actuated, feed is conveyed down the tubes by the driver elements to various feed delivery locations.

Some such systems use a helical spring element of extended length as a driver element. When the helical driver element is rotated, feed is moved along the conduit with an auger motion, but the driver element is not extensively axially displaced. Such devices are disclosed in U.S. Pat. Nos. 3,918,405 and 3,893,423, and elsewhere.

In other forms of feed conveying devices, a feed driver element is physically displaced—that is, pushed or pulled—through the conduits by a power means. This driver element can take the form of a helical spring, in the manner illustrated in co-pending U.S. patent application Ser. No. 354,233 filed Mar. 3, 1982, or in U.S. Pat. No. 3,003,464. Alternatively, the driver element can take the form of a flexible, multi-link chain, one such device being shown in U.S. Pat. No. 2,681,639 to Littlefield. This multi-link chain can, of course, take a number of forms alternate to the embodiment shown in that patent.

As suggested above, feed rations which are accurate in quantity and in quality must be repeatedly delivered to each poultry-containing cage. It is usually desirable that each cage receive a certain amount of each constituent in the feed mix, and that the amounts of each constituent not vary excessively throughout the delivered rations. Consequently, a feed conveyor system must be able to make accurately quantified deliveries of thoroughly commingled feed mixtures on a reliable basis. In addition, the conveyor system itself must be capable of being manufactured, offered and operated at a commercially attractive price.

It is accordingly the general object of the present invention to provide a feed system for caged poultry and the like in which feed is transferred and intermixed among various parts of the system during feed movement and feed delivery operations. In this way, proper amounts of each constituent in the feed mix are offered to the consuming poultry. A related object is to provide a feed system which encourages each bird in the flock to eat a balanced diet of the offered feed.

Another object is to provide such a feed system in which power is economically applied to the feed-driving of feed-moving elements at several locations throughout the system. In this way, good system performance is encouraged.

Still another object is to provide a mechanism for feeding poultry and like caged animals which discourages the fowl from playing with the feed during feed delivery, and which discourages the fowl from raking the feed during consumption periods.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 5 is a top plan view of the novel system shown in FIGS. 1, 2 and 3;

FIG. 6 is a fragmentary sectional view taken substantially in the plane of line 6—6 in FIG. 4;

FIG. 7 is a fragmentary elevational view of a system transfer tube and associated drop-out tube; and FIG. 8 is a fragmentary sectional view taken substantially in the plane of line 8—8 in FIG. 7.

DETAILED DESCRIPTION

While the invention will be described in connection with a preferred embodiment and procedure, it will be understood that it is not intended to limit the invention to this embodiment or procedure. On the contrary, it is intended to cover all alternatives, modifications and equivalents as may be included within the spirit and scope of the invention as defined by the appended claims.

Figure 1:
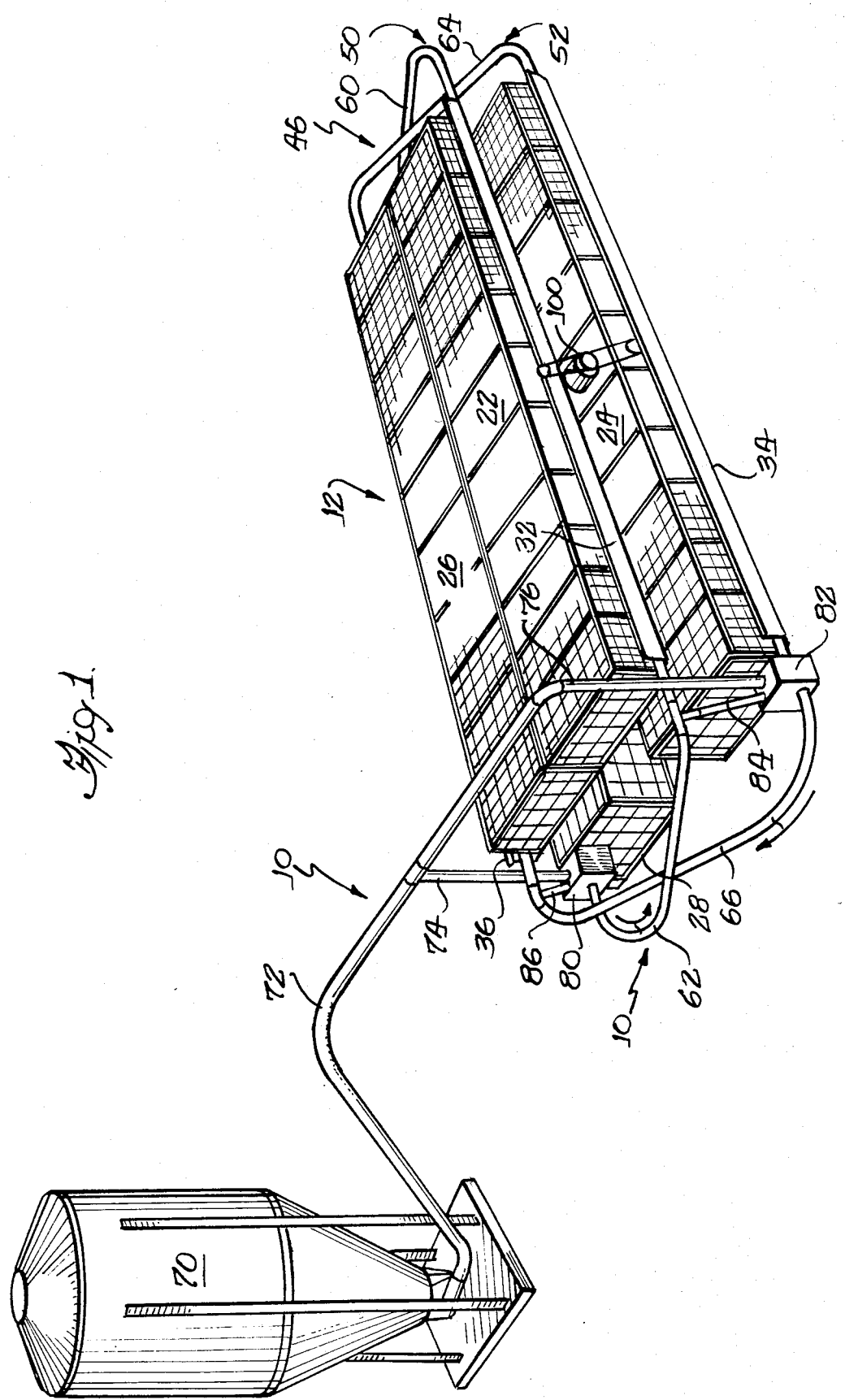
FIG. 1 is a perspective view showing the novel feed-conveying and feed-delivery system of the present invention as it appears in association with a series of poultry confinement cages.
Figure 2:
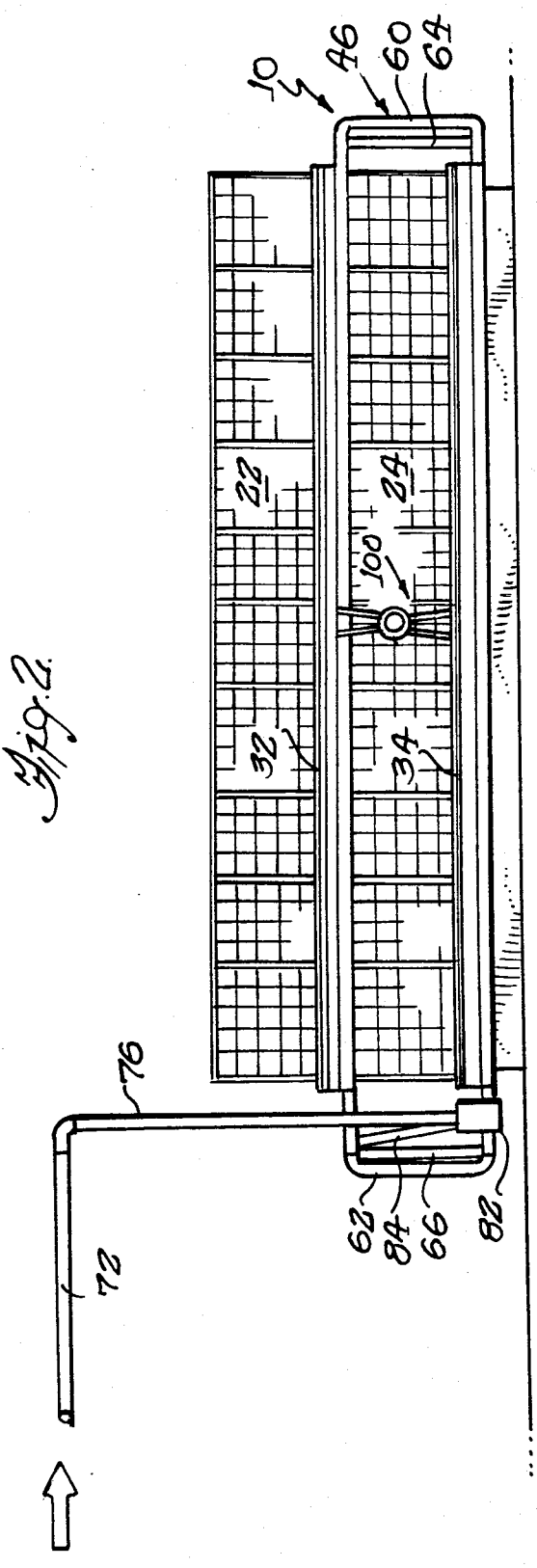
FIG. 2 is a side elevational view of the cages and delivery system shown in FIG. 1.
Figure 3:
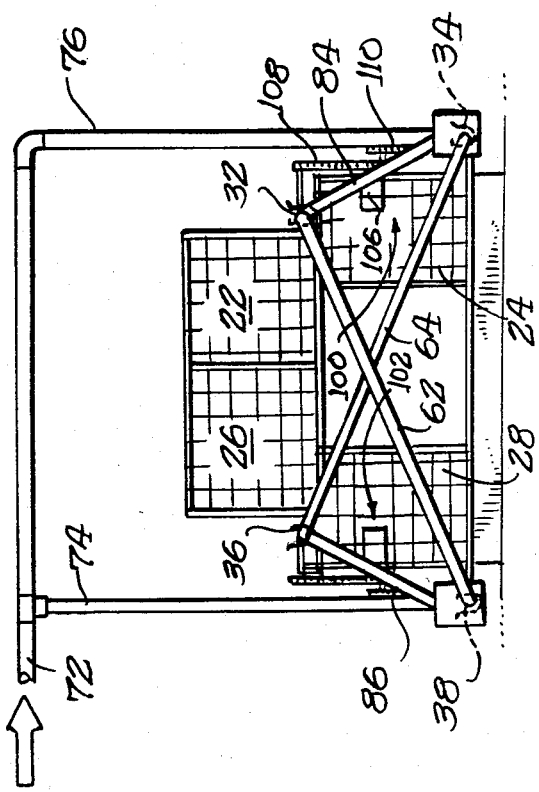
FIG. 3 is an end elevational view of the novel feed delivery system and cages shown in FIGS. 1 and 2.

Turning first to FIGS. 1, 2 and 3, there is shown a novel feed conveying system 10 as it appears when it is installed for use in association with an array of poultry confinement cages 12. Here, this set of cages takes the form of an oppositely facing, pyramidal, stepped back, multi-level array constructed in accordance with U.S. Pat. No. 4,060,055, but it is contemplated that the conveying system could be used with other cage constructions and arrays. In the illustrated format, an upper row or level of cages 22 and a lower row 24 of similar cages face in a first direction. Another upper level or row of cages 26 and a lower row 28 face in an opposite direction. Adjacent the faces of each of these rows of cages 22–28 is a corresponding elongated open-topped trough 32–38. These troughs 32–38 can be located and conveniently mounted in association with the cages as shown in U.S. Pat. No. 4,060,055 mentioned above.

Figure 4:
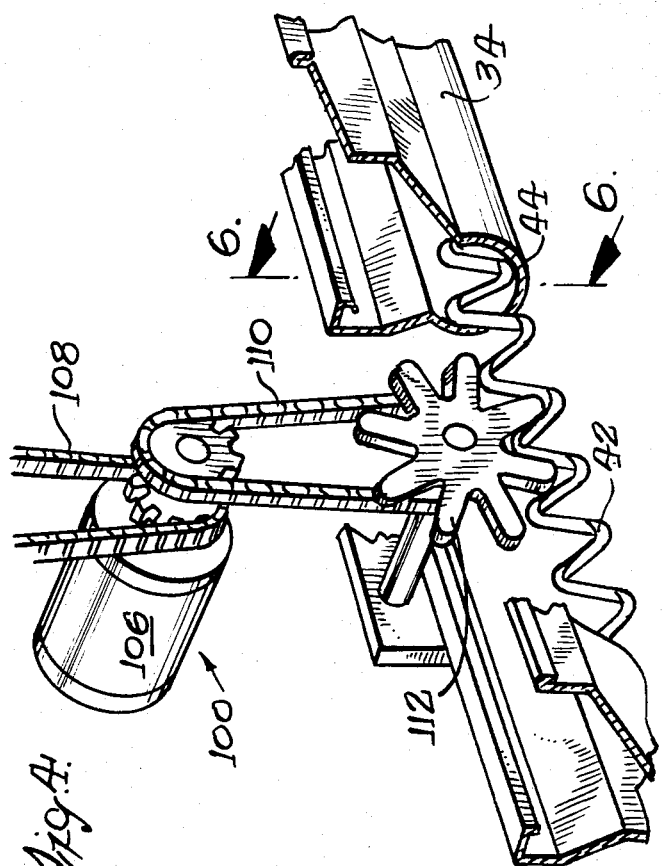
FIG. 4 is a fragmentary perspective view showing portions of various feed-driving and power elements.

Within these troughs 32–38 and associated conduits are disposed driver elements, which here take the form of endless open-center helical springs 40 and 42, as illustrated in FIG. 4. It will be understood that these driver elements 40, 42 are disposed in the bottom 44 of the open-topped troughs, as suggested in FIG. 4, and that various closed-top tube elements 46 interconnect the various troughs 32–38 so as to permit the driver elements 40, 42 and associated feed to move from one trough to another.

As explained above, it is an object of the present invention to provide thoroughly mixed rations of feed to all the caged poultry in all the cages, and to provide those ration constituents in substantially equal amounts or ratios. To this end, a first endless conduit assembly 50 and a second endless conduit assembly 52 are disposed so as to service all the rows of cages. Particularly, the first endless conduit assembly 50 can be considered to have a first trough run 32 extending past the upper level of cages 22 which face in a first direction. The assembly 50 then extends diagonally downwardly along a first transfer conduit or pipe 60 to a second trough run 38 which extends past the lower level of cages 28 facing in the second or opposite direction. A second closed pipe or conduit 62 permits feed to be drawn from the lower, opposite-facing trough run 38 back to the upper, first-facing trough run 32 in an endless manner.

The second endless conduit 52 includes the trough 36 adjacent the faces of the upper level of cages 26 which face in the opposite or second direction, and then extends down a transfer pipe 64 to the trough 34 associated with the lower level of cages 24 facing in the first direction. Another closed conduit transfer pipe 66 leads feed from that lower trough 34 and lower level of cages 24 back up to the first, oppositely facing cages 26 and the associated trough 36.

As illustrated particularly in FIG. 1, feed is delivered to these first and second conduits 50, 52 from a remote source such as a bulk delivery bin 70 which can be conveniently located outside the poultry house (not shown). A header conveyor 72 extends into the house at an elevated location. A first delivery tube 74 drops feed from the header conveyor 72 to the first endless conduit assembly 50, and a second delivery drop tube 76 likewise delivers feed to the second endless conduit assembly 52.

A first fill cup 80 is associated with the first endless conduit 50, and a second fill cup 82 is respectively associated with the second conduit 52. As can be envisioned, feed returning to the fill cups 80, 82 is introduced to and mixed with new feed being delivered by the overhead header conveyor 72 and the associated drop tubes 74, 76 so as to carry out the invention.

To provide a controlled and uniform level of feed in the upper troughs 32, 36 so as to carry out the invention, a first drop tube 84 is disposed to drop feed from the first conduit upper run 32 down to the second conduit lower run 34. Correspondingly, a second drop tube 86 is disposed to drop feed from the second conduit upper run 36 down to the first conduit lower run 38. Each of these drop tubes 84, 86 conveniently extends into the respective fill cups 80, 82.

In accordance with another aspect of the invention, the amounts of feed offered to poultry in the upper cages are carefully controlled. To this end, feed is bled off from the upstream ends of the upper runs 32 and 36 by the drop tubes 84 and 86. In carrying out this aspect of the invention, the amount of feed to be bled off can be varied. This is accomplished here by the structure shown in FIGS. 7 and 8. A short drop-out section 90 is connected between the transfer pipe 66 and the run conduit 36 by bell-and-spigot joints 92, 94, or other suitable arrangements. A drop-out aperture 96 is formed in this section 90. By rotating the section 90 as suggested by the arrows R, the location of the drop-out aperture 96 can be varied, and the amount of feed diverted to the surrounding and depending drop-out tube 86 can be correspondingly adjusted. The remaining feed not dropped into the tube 86 is taken into the run 36 for presentation to poultry in the cages 26. It will be understood that similar adjustment structure connects the conduits 62 and 32 with the drop-out tube 84.

It is yet another feature of the invention that the driver elements 40, 42 are moved throughout the system in a co-ordinated and economical manner. To this end, in the embodiment illustrated here, power units 100, 102 are each disposed midway between the ends of the trough and cage runs, as can be envisioned from FIGS. 2 and 3. (It will be understood that the first power unit 100 illustrated in FIG. 4 is like the second power unit 102.) A prime mover such as an electric motor 106 is connected, by a chain drive 108 to a driver element located in the upper run 32 of the first conduit 50, and connected by another chain drive 110 to the driver element 112 located in the lower run 34 of the second conduit 52. The second power unit 102 is similarly connected to the driver element located in the upper run 36 of the second conduit 52, and to the driver element located in the lower run 38 of the first conduit 50. In operation, each power unit 100, 102 thus pulls on one half of each driver element, and pushes on the other half of that same driver element. Since the motors in each power unit 100, 102 are caused to operate at the same speed, none of the driver elements are stretched or compacted to any deleterious extent. (This motor speed matching is caused by conventional electrical circuitry, not shown.) As a result, those portions of the driver elements going through the elbows and transfer tubes 60–66 do not engage the tubes with aggressive frictional engagement in a manner which might cause excessive wear. Those skilled in the design and operation of systems such as this will recognize that four or more individual motor drives can be employed, and that the drives (of whatever sort) can be installed at the ends of the trough runs or at other convenient locations without departing from the spirit and scope of the invention.

In accordance with another aspect of the invention, fowl are discouraged from playing with the feed during feed delivery, and they are also discouraged from raking the feed during consumption periods. To accomplish this, the level or depth of feed in each trough is adjusted to a point below the top of the helical driver windings, as shown in FIG. 6. When the driver element 42 (or 40, in the opposite conduit system 50) is moved over the trough bottom 44, the upwardly extending, forwardly moving windings 120, 122 strike the beak of any fowl reaching into the trough bottom. This beak striking action discourages the bird from playing with the feed during driver movement and feed delivery periods.

When the driver 42 (or 40) is at rest during feed consumption periods, the fowl are discouraged from raking the feed and attempting to consume only the most choice morsels. This is accomplished in further accordance with the invention by locating the maximum feed level below the top of the vertically extending driver windings 120, 122. Because these windings protrude above the top of the feed, the fowl cannot conveniently push the feed in a direction parallel to the length of the driver 42 or trough 34. Pushing, stirring or raking is inhibited.

It may be helpful to envision the path of travel of feed as it moves throughout the novel conveyor and conduit system. As can be envisioned especially from FIG. 1, the feed moves from the bulk storage bin 70 through the header conveyor 72, and drops down the delivery tube 74 into the fill cup 80, or down the tube 76 into the cup 82. Feed is then conveyed up the transfer tubes 62 and 66 of the conveyer conduit 50 and 52. The sleeves and drop tubes 84, 86 operate to adjust the level of feed being introduced to the troughs 32, 34, 36 and 38 to the level described above. If a particular feed particle is not consumed before driver motion and feed re-supply begin again, the particle will travel endlessly about the feeding system in an endless but more or less random pattern until the feed particle is consumed. The particle is periodically mixed with new or incoming feed particles so as to encourage the presentment and delivery of a fully mixed, carefully balanced diet to each of the resident poultry population.

The invention is claimed as follows:

1. A conveyor system for delivering feed to poultry cages which are organized in an oppositely facing, multi-level array, the system comprising, in combination, a first endless conduit extending along an upper conduit run past an upper level of cages facing in a first direction and extending along a lower conduit run past a lower level of cages facing in a second, opposite direction, and a second endless conduit extending along an upper conduit run past an upper level of cages facing in that second, opposite direction, and extending along a lower conduit run past a lower level of cages facing in the first direction, a feed trough disposed adjacent the faces of each level of cages, the conduits communicating with the troughs to provide feed in the troughs which the caged poultry may eat, first and second driver elements respectively disposed in the first and second conduits for carrying feed through the respective conduits and to the respective troughs and cages, and means for translatably displacing and driving the drive elements axially in an endless path around each endless conduit, first delivery means for delivering feed to the first conduit at a point immediately upstream of the first conduit lower run, and second delivery means for delivering feed to the second conduit at a point immediately upstream of the second conduit lower run, and header means for delivering feed to the first delivery means and second delivery means from a common source.

2. A conveyor system according to claim 1 wherein said first and second driver elements comprise helical springs.

3. A conveyor system according to claim 1 wherein said driver elements include portions extending vertically, and wherein the system includes adjustment means for adjusting the level of feed in said runs to be located below the tops of the vertically extending portions of the driver elements, for inhibiting fowl feed play and fowl feed raking.

4. A conveyor system according to claim 1 wherein said first and second driver elements move in opposite directions.

5. A conveyor system according to claim 1 further including first power means for driving the first driver element at a point on the first conduit upper run, and for driving the second driver element at a point on the second conduit lower run.

6. A conveyor system according to claim 5 further including second power means for driving the first driver element at a point on the second conduit upper run, and for driving the second driver element at a point on the first conduit lower run.

7. A conveyor system according to claim 1 further including first drop tube means for dropping feed from the first conduit upper run to the second conduit lower run.

8. A conveyor system according to claim 7 further including second drop tube means for dropping feed from the second conduit upper run to the first conduit lower run.

9. A conveyor system according to claim 1 further including a first fill cup located at a point immediately downstream of the first conduit lower run for receiving feed from a first delivery means, and for commingling the newly-received feed with feed already in the first conduit.

10. A conveyor system according to claim 9 further including a second feed cup located at a point immediately downstream of the second conduit lower run for receiving feed from a second delivery means and for commingling the newly-received feed with feed already in the second conduit.

11. A conveyor for conveying particulate feed to an array of animal confinement cages, the cages including a lower cage row facing in a first direction, a lower cage row facing in an opposite direction, an upper cage row facing in a first direction, and an upper cage row facing in an opposite direction, the conveyor including conduit runs extending past the face of each row of cages, a feed trough disposed adjacent the face of each row of cages, the conduits communicating with the troughs to provide feed in the troughs which the caged poultry may eat, a first transfer conduit run extending from the lower row of cages facing in the first direction to the upper row of cages facing in the opposite direction, and a second transfer conduit run extending from the lower row of cages facing in the opposite direction to the upper row of cages facing in the first direction, axially translatable driver means disposed in the conduit means for carrying feed through the conduit runs and to the respective troughs and cages, power means for driving the driver means through the conduit runs, and delivery means for delivering feed to the conduit runs.

12. A conveyor system according to claim 11 further including first drop tube means for dropping feed from that conduit run which extends past the upper row of cages facing in a first direction to that conduit run which extends past the lower row of cages facing in that same first direction, and second drop tube means for dropping feed from the conduit run extending past the upper row of cages facing in an opposite direction to the conduit run extending past the lower row of cages facing in that same opposite direction.

13. A conveyor system according to claim 11 further including first and second fill cups for receiving feed from a delivery means, and for commingling the received feed with feed in those conduit runs extending past the lower rows of cages.

14. A conveyor system according to claim 11 wherein said driver element means includes portions extending upwardly from a trough run bottom, and wherein said system includes adjustment means for adjusting the level of feed in said trough run to be located below the tops of the upwardly extending drivers elements, for inhibiting fowl feed play and fowl feed raking.

15. A conveyor system according to claim 11 further including delivery means for delivering feed to each of the conduit runs which extend past the fact of a lower row of cages.

16. A conveyor system according to claim 15 wherein said delivery means includes a common header means for receiving feed from a common source, and first and second delivery tube means each extending from the common header means to a lower conduit run.

17. A conveyor system according to claim 11 further including driver element means disposed in the conduit runs for urging the feed along the runs.

18. A conveyor system according to claim 17 wherein said driver element means includes helical spring means.

19. A conveyor system according to claim 17 further including power means for displacing said driver element means along the conduit.

20. A method of delivering feed to a plurality of poultry cages which are organized in an oppositely facing, multi-level array, the method comprising the steps of endlessly urging a first mass of feed particles along a first path past an upper level of cages facing in a first direction and past a lower level of cages facing in an opposite direction for presenting the feed particles to birds in said cages, endlessly urging a second mass of feed particles along a second path past an upper level of cages facing in that second or opposite direction, and past a lower level of cages facing in the first direction for presenting the feed particles to birds in said cages, and transferring said feed paticles between said first and said second endless paths to adjust the level of feed in the paths.

* * * * *